United States Patent
Hota et al.

(10) Patent No.: US 10,275,316 B2
(45) Date of Patent: Apr. 30, 2019

(54) STORAGE SYSTEM, CONTROL METHOD OF STORAGE SYSTEM, SERVER APPARATUS, AND CONTROL METHOD OF SERVER APPARATUS

(71) Applicant: Hitachi, Ltd., Tokyo (JP)

(72) Inventors: Hiromu Hota, Tokyo (JP); Masanori Takata, Tokyo (JP); Hitoshi Arai, Tokyo (JP); Masaaki Iwasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 231 days.

(21) Appl. No.: 15/122,787

(22) PCT Filed: Aug. 27, 2014

(86) PCT No.: PCT/JP2014/072352
§ 371 (c)(1),
(2) Date: Aug. 31, 2016

(87) PCT Pub. No.: WO2016/030972
PCT Pub. Date: Mar. 3, 2016

(65) Prior Publication Data
US 2017/0068600 A1   Mar. 9, 2017

(51) Int. Cl.
*G06F 11/14* (2006.01)
*G06F 16/178* (2019.01)
*G06F 16/182* (2019.01)

(52) U.S. Cl.
CPC ...... *G06F 11/1451* (2013.01); *G06F 11/1448* (2013.01); *G06F 11/1464* (2013.01); *G06F 11/1474* (2013.01); *G06F 16/178* (2019.01); *G06F 16/182* (2019.01); *G06F 2201/80* (2013.01); *G06F 2201/805* (2013.01)

(58) Field of Classification Search
CPC ............. G06F 11/1451; G06F 11/1448; G06F 11/1464; G06F 11/1474; G06F 17/30174; G06F 17/30194; G06F 2201/80; G06F 2201/805; G06F 16/182; G06F 16/178
USPC ......................................................... 707/615
See application file for complete search history.

(56) References Cited

U.S. PATENT DOCUMENTS

| | | | |
|---|---|---|---|
| 2012/0016838 A1 | 1/2012 | Arai et al. | |
| 2012/0054156 A1* | 3/2012 | Mason, Jr. | .......... G06F 17/3023 707/679 |
| 2012/0203742 A1 | 8/2012 | Goodman et al. | |
| 2014/0059009 A1* | 2/2014 | Blea | ..................... G06F 11/1471 707/645 |

(Continued)

OTHER PUBLICATIONS

International Search Report of PCT/JP2014/072352 dated Nov. 4, 2014.

*Primary Examiner* — Evan Aspinwall
(74) *Attorney, Agent, or Firm* — Mattingly & Malur, PC (57) ABSTRACT

A file on file storage is archived as an object on object storage. In this case, a correspondence between UUID which is an identifier of the object and a path or an inode number which is an identifier of the file is recorded. This is referred to as correlation between the file and the object. However, because of changing of the path due to the renaming of the file, or changing of the inode number due to overwriting of the file, the correlation is likely to be lost. The invention provides a technique that restores the lost correlation and causes the correlation between the file and the object to be maintained.

13 Claims, 7 Drawing Sheets

(56) References Cited

U.S. PATENT DOCUMENTS

| | | | | |
|---|---|---|---|---|
| 2014/0222761 A1* | 8/2014 | Zhang | ................ | G06F 11/1451 |
| | | | | 707/654 |
| 2014/0337685 A1* | 11/2014 | Baptist | ................ | G06F 11/1448 |
| | | | | 714/763 |
| 2014/0372376 A1* | 12/2014 | Smith | ............... | G06F 17/30174 |
| | | | | 707/624 |
| 2015/0269032 A1* | 9/2015 | Muthyala | ............ | G06F 11/1464 |
| | | | | 707/639 |
| 2015/0309891 A1* | 10/2015 | Saika | ................ | G06F 11/1417 |
| | | | | 714/4.11 |
| 2016/0210308 A1* | 7/2016 | Shekhar | ............ | G06F 17/30174 |

* cited by examiner

| PATH | INODE NUMBER |
|---|---|
| / | 2 |
| /file1 | 101 |
| /file2 | 103 |
| ... | ... |

(b) 720

| INODE NUMBER | UUID |
|---|---|
| 2 | uuid1 |
| 101 | uuid2 |
| 102 | uuid3 |
| ... | ... |

(c) 730

| PATH | UUID |
|---|---|
| / | uuid1 |
| /file1 | uuid2 |
| /file2 | uuid3 |
| ... | ... |

| PATH | INODE NUMBER |
|---|---|
| / | 2 |
| /file1 | 101 |
| /file2 | 103 |
| ... | ... |

(b) 820

| INODE NUMBER | UUID |
|---|---|
| 2 | uuid1 |
| 101 | uuid2 |
| 103 | uuid3 |
| ... | ... |

(c) 830

| PATH | UUID |
|---|---|
| / | uuid1 |
| /file1 | uuid2 |
| /file2 | uuid3 |
| ... | ... |

| INODE NUMBER (901) | URL (902) |
|---|---|
| 2 | http://www.xxx.com/yyy1 |
| 101 | http://www.xxx.com/yyy2 |
| 102 | http://www.xxx.com/yyy3 |
| ⋮ | ⋮ |

| PATH (1001) | URL (1002) |
|---|---|
| / | http://www.xxx.com/yyy1 |
| /file1 | http://www.xxx.com/yyy2 |
| /file2 | http://www.xxx.com/yyy3 |
| ⋮ | ⋮ |

| URL (1101) | VERSION (1102) | TIME AND DATE OF ARCHIVE (1103) |
|---|---|---|
| http://www.xxx.co.jp/yyy1 | 1 | 2014/5/20 00:00:00 |
| http://www.xxx.co.jp/yyy2 | 1 | 2014/5/20 00:00:00 |
| http://www.xxx.co.jp/yyy3 | 1 | 2014/5/20 00:00:00 |
| http://www.xxx.co.jp/yyy1 | 2 | 2014/5/21 00:00:00 |
| http://www.xxx.co.jp/yyy2 | 2 | 2014/5/21 00:00:00 |
| http://www.xxx.co.jp/yyy3 | 2 | 2014/5/21 00:00:00 |
| ⋮ | ⋮ | ⋮ |

[Fig. 12]

STORAGE SYSTEM, CONTROL METHOD OF STORAGE SYSTEM, SERVER APPARATUS, AND CONTROL METHOD OF SERVER APPARATUS

TECHNICAL FIELD

The present invention relates to a technique in which correlation between archive source files and archive destination files is maintained in a system that archives the files from file storage to separate file storage.

BACKGROUND ART

Recently, the amount of file data which companies handle tends to increase, and the cloud storage technique draws attention in view of unitary management of the file, scalability and continuity of business affairs and the like. In the cloud storage technique, for example, there is a type of technique in which file storage is disposed in a client site, and the file data of the file storage is archived to be stored in object storage of a remote site. In this case, there is a demand of the client that the old file archived in the object storage is necessary to be restored by the operation performed in the client side. In order to meet this demand, it is necessary to maintain a correspondence between file identifiers of the file storage disposed in the client site and file identifiers disposed in the object storage of the archive destination.

Herein, as methods for backing up the file from file storage to separate file storage, PTL 1 and PTL 2 are known.

In the PTL 1, a method is disclosed in which a plurality of files is collectively compressed to back up the compressed file. In the case of the backup, the correspondence between a path which is an identifier in the backup source of the backup target file and a snapshot ID which is an identifier in the backup destination is managed in the backup destination.

In the PTL 2, a method is disclosed in which the file is backed up in a remote object storage from local file storage. In the file storage described in the PTL 2, the file is identified with a path or an inode number. Further, a correspondence between the path and the inode number is managed by the file storage. In the backup method described in the PTL 2, a backup source manages the correspondence between an inode number of a backup source file and a URL which is an identifier of the backup destination object.

CITATION LIST

Patent Literature

PTL 1: US Patent Application Publication No. 2012/0203742
PTL 2: US Patent Application Publication No. 2012/0016838

SUMMARY OF INVENTION

Technical Problem

However, in the related art, there is a problem that because the path or inode number which is the file identifier in the backup source is changed, the correspondence relationship between the identifier of the backup source and the identifier of the backup destination cannot be maintained.

In the method of the PTL 1, if the backup is performed, the path in the backup source is recorded. However, if the path is changed after backup, there is a problem that because the snapshot ID which is an identifier in the backup destination is maintained to correspond to the path before change, the correspondence relationship between the path which is the identifier of the backup source and the snapshot ID which is the identifier of the backup destination is disconnected.

In the method of the PTL 2, if backup is performed, a correspondence between the inode number of the backup source file and a URL of the backup destination object is recorded.

Herein, for example, if overwriting of the file is performed so as to delete the file before overwriting and make the file after overwriting have the same path, the inode number is changed. When such overwriting of the file occurs, there is a problem that the URL which is an identifier of the backup destination object of the file is maintained to correspond to the inode number before change, and thus the relationship between the path which is the identifier of the backup source and the URL which is the identifier of the backup destination is disconnected.

The invention is made based on the circumstances described above, and is to provide a technique in which correlation between archive source files and archive destination files is maintained even if the path or inode number is changed.

Solution to Problem

A server apparatus is connected to a first storage apparatus which identifies a file with a first identifier and a second identifier and a second storage apparatus which identifies the file with a third identifier. The second storage apparatus manages a first correspondence relationship between the first identifier and the third identifier. The server apparatus manages a third correspondence relationship between the first identifier and the second identifier and a second correspondence relationship between the second identifier and the third identifier. If the first identifier which identifies the file is changed, the server apparatus specifies the third identifier corresponding to the changed first identifier on the basis of the third correspondence relationship and the second correspondence relationship, transmits the specified third identifier and the changed first identifier to the second storage apparatus, and instructs update of the first correspondence relationship. Further, if the second identifier which identifies the file is changed, the server apparatus correlates the third identifier with the changed second identifier in the second correspondence relationship and thereby updates the second correspondence relationship, the third identifier corresponding to the changed second identifier and being specified on the basis of the third correspondence relationship and the first correspondence relationship.

Advantageous Effects of Invention

According to the invention, even if the first identifier or the second identifier which is the file identifier in the archive source is changed, it is possible to maintain correlation between the third identifier which is the file identifier in the archive destination and the first identifier and the second identifier.

DESCRIPTION OF EMBODIMENTS

First Embodiment

<System Configuration>

Figure 1:
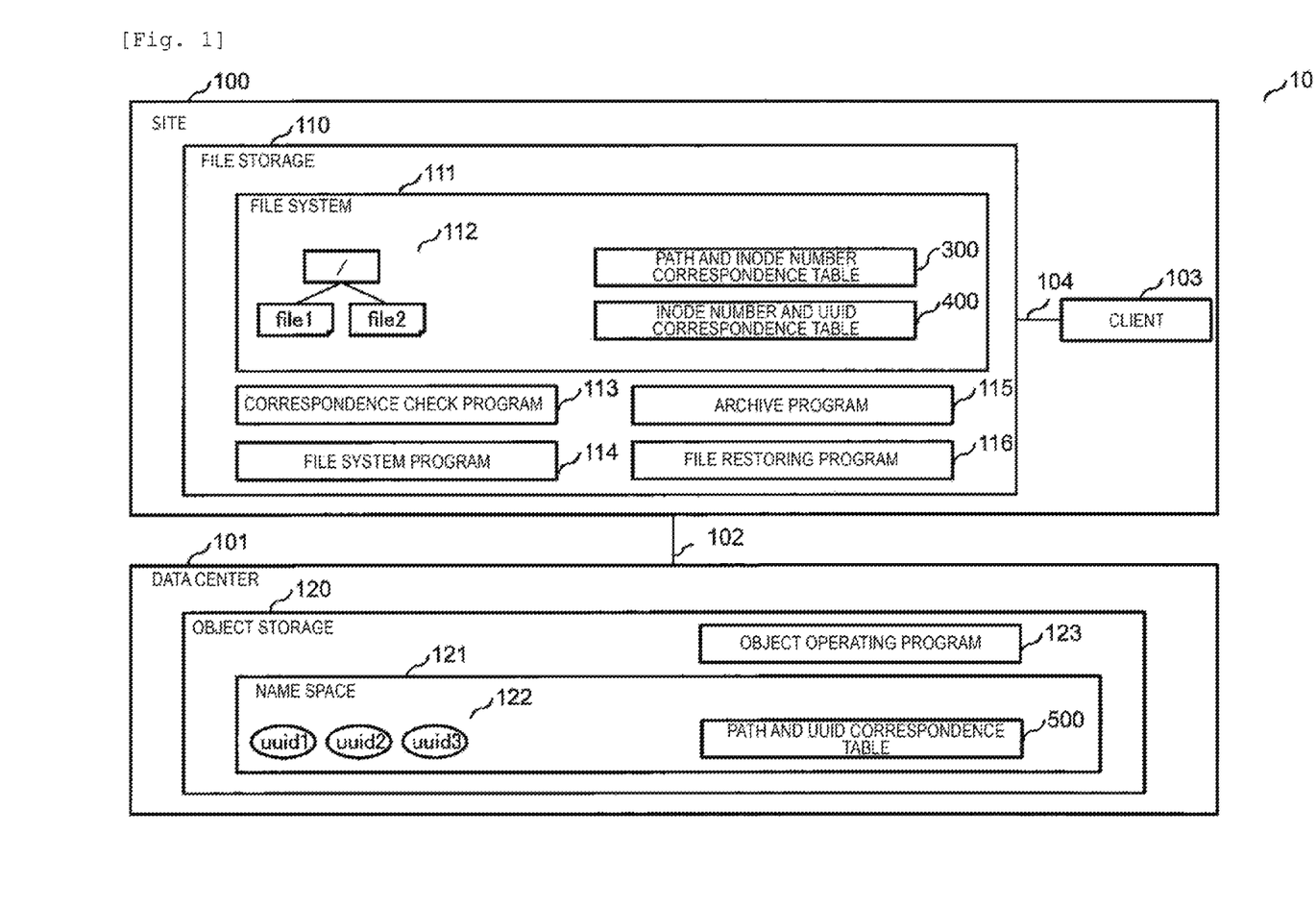
FIG. 1 is a diagram showing an example of a system configuration according to the invention.

FIG. 1 is a diagram explaining a physical configuration example of a computing system according to this embodiment and an outline of this embodiment.

A computing system 10 is configured to include a site 100 and a data center 101 which are connected with each other through a network 102. The site 100 is configured to include a client 103 and file storage 110 which are connected with each other through a network 104. The data center 101 is configured to include object storage 120.

In the example of FIG. 1, the site 100 and the data center 101 are shown as being singular, respectively. However, there may be plural sites 100 and/or plural data centers 101. Further, in the example of FIG. 1, the client 103 is shown as being singular, but the number thereof may be plural. The network 102 is WAN and the network 104 is LAN. The network of the invention is not limited thereto, but may be several types of networks.

The client 103 is a computing machine that uses a file sharing service provided by the file storage 110 through file sharing protocols such as a network file system (NFS) and a common internet file system (CIFS).

The file storage 110 is a computing machine which is configured to include one or plural file systems 111, a correspondence check program 113, a file system program 114, an archive program 115, and a file restoring program 116. The file system 111 is configured to include files and directories 112, a path and inode number correspondence table 300, and an inode number and universally unique identifier (UUID) correspondence table 400.

The object storage 120 is a computing machine that is configured to include one or plural name spaces 121 and an object operating program 123. The name space 121 is configured to include objects 122, a path and UUID correspondence table 500.

The client 103 uses a file sharing service to perform operations which include creating, updating, deleting, renaming the file and directory 112, and the like with respect to the file system 111 disposed within the file storage 110.

Figure 2:
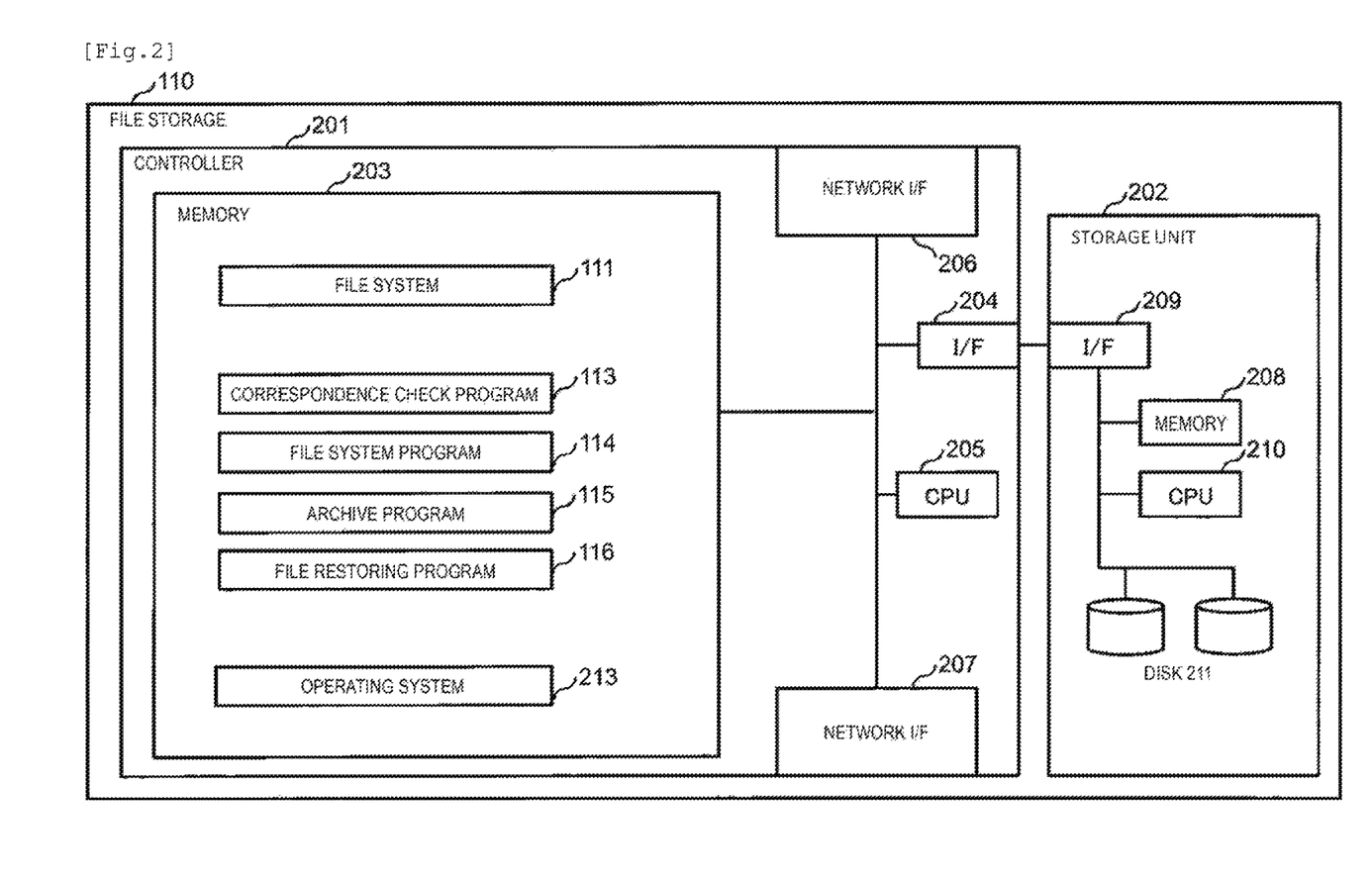
FIG. 2 is a diagram showing an example of a hardware and software configuration in file storage according to the invention.

FIG. 2 is a diagram showing an example of a hardware and software configuration in the file storage 110. The file storage 110 includes a controller 201 and a storage unit 202. The controller 201 provides a file sharing service for the client 103 and stores various types of files or file system configuration information which is created by the client 103, in the storage unit 202. Further, the controller 201 has a cooperative function related to the object storage 120. The object storage 120 has the same hardware and software configuration as that of the file storage 110.

The controller 201 includes a memory 203 that stores programs or data therein, a storage interface 204 through which the storage unit 202 is connected with the controller 201, a CPU 205 that executes the programs stored in the memory 203, a network interface 206 that is used for communicating with the client 103 through the network 104, and a network interface 207 that is used for communicating with the data center 101 through the network 102, which are all connected with each other through a bus and the like.

The memory 203 stores a file system 111, a correspondence check program 113, a file system program 114, an archive program 115, a file restoring program 116, and an operating system 213. Further, each program or each system stored in the memory 203 may be also stored in the storage unit 202, and the CPU 205 may read the stored program and the system into the memory 203 to execute the read program or system.

The storage unit 202 includes a storage interface 209 through which the controller 201 is connected with the storage unit 202, a CPU 210 that executes an instruction sent from the controller 201, a memory 208 that stores programs or data therein, and one or plural disks 211, which are all connected with each other through a bus or the like. Those configurations are described only as examples and the file storage 110 is not necessarily one physical machine. For example, the controller 201 may be formed as a file server and the like, and the storage unit 202 may be formed as block storage and the like such that the file storage 110 is configured of a separate physical machine.

<Archive Processing>

The archive program 115 archives the file and directory 112 disposed in the file system 111 to the name space 121 of the object storage 120 through communication protocols such as hyper text transfer protocol (HTTP). Herein, the archive means copying and changing the file and directory 112 in the file system 111 to the object storage 120 without changing, and holding the file and directory 112 in the name space 121 of the object storage 120 for long-term storage. The archived file and directory is not updated and deleted but remains intact from the archive starting time, even though the corresponding file and directory is updated, deleted and the like in the file storage 110. For this reason, it is possible to restore the file and directory of a certain time.

Further, the archived file and directory is managed in the form of a data unit which is referred to as an object 122. The object 122 is identified with the UUID in the object storage 120. In the object storage 120, the UUID is an identifier that identifies the object in the object storage 120 uniquely. The archive according to this embodiment is performed at a regular interval such as at a time a day. The archive, however, may be performed in synchronization with operations for creating, updating, deleting, or renaming the file (or directory), at an arbitrary timing based on the circumstances of the client or an administrator.

Further, for example, if a certain condition occurs such that the capacity of the file storage 110 exceeds a threshold value, a stubbing process may performed in which only metadata (stub) including the path and the inode number correlated with a storage destination of the object storage 120 is saved, for example in an order from the oldest access date of the file (or directory), the substantial body (the substantial data) of the file (or directory) is deleted from the file storage 110. In this case, if an I/O is received from the client 103 through a stub, the substantial body of the file (or directory) corresponding to the stub is restored to the file storage 110 from the object storage 120, and thereby executes the I/O. Because the file (or directory) and the stub are not distinguished from each other in the client 103, the stubbing process does not cause the client 103 to be aware of the file (or directory) or the stub, but can cause the capacity of the file storage 110 to be saved.

The file (or directory) is identified with a path or an inode number in the file storage 110. The inode number is an internal identifier through which the file system 111 identifies the file. The inode number is allocated to the file (or directory) during creation of the file (or directory) and is not changed until the file (or directory) is deleted. However, since there is an overwriting scheme for the file (or the directory) in which the file (or directory) is created and the new inode number is allocated thereto, and thereby the file is deleted before being overwritten, in this case, the path or the UUID remains intact corresponding to the inode number of the deleted file, and thus the inode number which is to correspond to the path or the UUID is changed. This phenomenon is simply referred to as "the inode number is changed" for simplicity in this specification.

On the other hand, the path is an external identifier which is defined in an OS, and through which the client and the like perform file access. The path is also an identifier which identifies the file or directory at a position in the directory structure. Accordingly, if the renaming of the file (or directory) causes a position on the directory structure to be changed, the path is changed. Therefore, the file storage 110 manages the correspondence between the two identifiers with the path and inode number table 300. Since updating of the path and inode number table 300 is performed upon being synchronous with operations of creating, deleting, renaming the file and the like, the correspondence between the path and the inode number is correctly maintained even if the path or the inode number is changed as described above.

Figure 3:
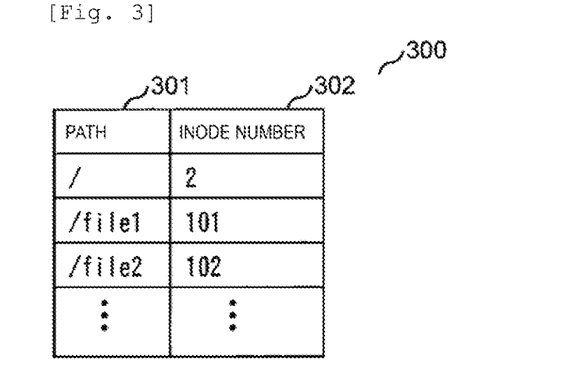
FIG. 3 is a diagram showing an example of a path and inode number correspondence table according to the invention.

FIG. 3 is a diagram showing an example of a configuration of the path and inode number correspondence table 300. The path and inode number correspondence table 300 manages a correspondence relationship between the path and the inode number which are allocated to the file (or directory). The path and inode number correspondence table 300 is configured to include the path 301 and the inode number 302. In the example of FIG. 2, for example, the file disposed in the path 301 "/file2" is allocated to the inode number 302 "102".

The file storage 110 manages the correspondence between the inode number of the file and directory 112 and the UUID of the object 122 with the inode number and UUID correspondence table 400. On the other hand, the object storage 120 manages the correspondence between the path of the file and directory 112 and the UUID of the object 122 with the path and UUID correspondence table 500. The correspondence between the inode number and the UUID, or the correspondence between the path and the UUID is referred to as "correlation" between the file (or directory) identified with the corresponding inode number or path, and the object identified with the corresponding UUID.

Figure 4:
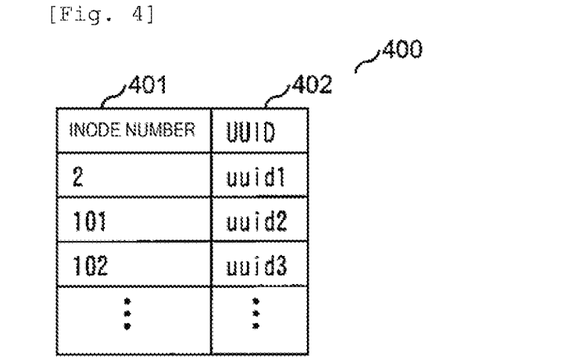
FIG. 4 is a diagram showing an example of an inode number and UUID correspondence table according to the invention.

FIG. 4 is a diagram showing an example of a configuration of the inode number and UUID correspondence table 400. The inode number and UUID correspondence table 400 manages a correspondence relationship between the UUID and the inode number which are allocated to the file (or directory). The inode number and UUID correspondence table 400 is configured to include the inode number 401 and the UUID 402. In the example of FIG. 3, for example, the file identified with the inode number "102" is archived as the object identified with the UUID "uuid3".

Figure 5:
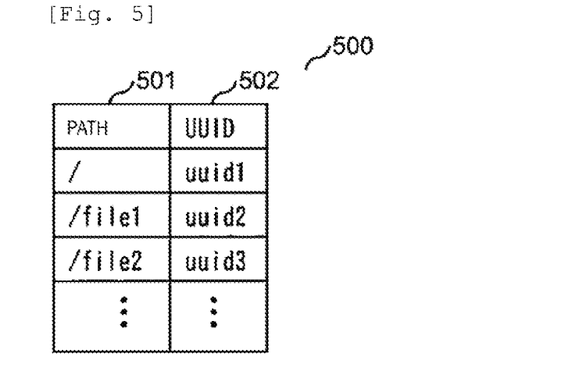
FIG. 5 is a diagram showing an example of a path and UUID correspondence table according to the invention.

FIG. 5 is a diagram showing an example of a configuration of the path and UUID correspondence table 500. The path and UUID correspondence table 500 manages a correspondence relationship between the path and the UUID which are allocated to the file (or directory). The path and UUID correspondence table 500 is configured to include a path 501 and the UUID 502. In the example of FIG. 5, for example, the file disposed in the path 501 "/file2" is archived as the object identified with the UUID "uuid3".

With reference to FIG. 3, FIG. 4 and FIG. 5, as an example of a file identified with the path "/file2", a procedure in which the file is registered in each correspondence table will be described. First, the client 103 transmits the path "/file2" and data. The file system program 114 stores the data as a file in the file system 112 through the path. In this case, the file system program 114 allocates the inode number "102" to the file to register a pair which is the path and the inode number to the path and inode number correspondence table 300. At the time of the first archive after the file is stored, the file system program 114 transmits the data and the path to the object operating program 123. The object operating program 123 performs an object process on the received data and stores the processed data in the name space 122. In this case, object operating program 123 allocates UUID "uuid3" to the object and registers a pair which is the path and the UUID to the path and UUID correspondence table 500. Finally, the object operating program 123 returns the UUID to the file system program 114. The file system program 114 registers a pair which is the inode number and the received UUID to the inode number and UUID correspondence table 400.

Further, as shown in FIG. 3 and FIG. 4, according to this embodiment, the correlation between the file (or directory) and the object is one to one. In this embodiment, the object correlated with the file (or directory) is a file (or directory) which is archived in a previous-time archive. However, the invention is not limited to those examples mentioned above, and the correlated object may be a file (or directory) or the like which is archived at the first-time archive.

In this embodiment, the inode number and UUID correspondence table 400 is managed in the file storage 110, but may be also managed in the file storage 110 and/or the object storage 120. Further, in this embodiment, the path and UUID correspondence table 500 is managed in the object storage 120, but may be managed in the file storage 110 and/or the object storage 120.

As described in this embodiment, if the path and UUID correspondence table 500 is managed in the object storage 120, even if the file storage 110 brakes down, it is possible to restore the file and directory 112 of the file system 112, using the path and UUID correspondence table 500 and the object 122 which is previously achieved. On the other hand, the path of the restored file and directory 112 is the same as that at the time of performing the archive, but there is a possibility that the inode number is different from that at the time of performing the archive.

<Correspondence Check Processing>

In order to maintain the correlation between the file (or object) and the object, the correspondence between the changed inode number or the changed path and the UUID is restored through the correspondence between the unchanged one and the UUID if one of the inode number and the path is changed.

Figure 6:
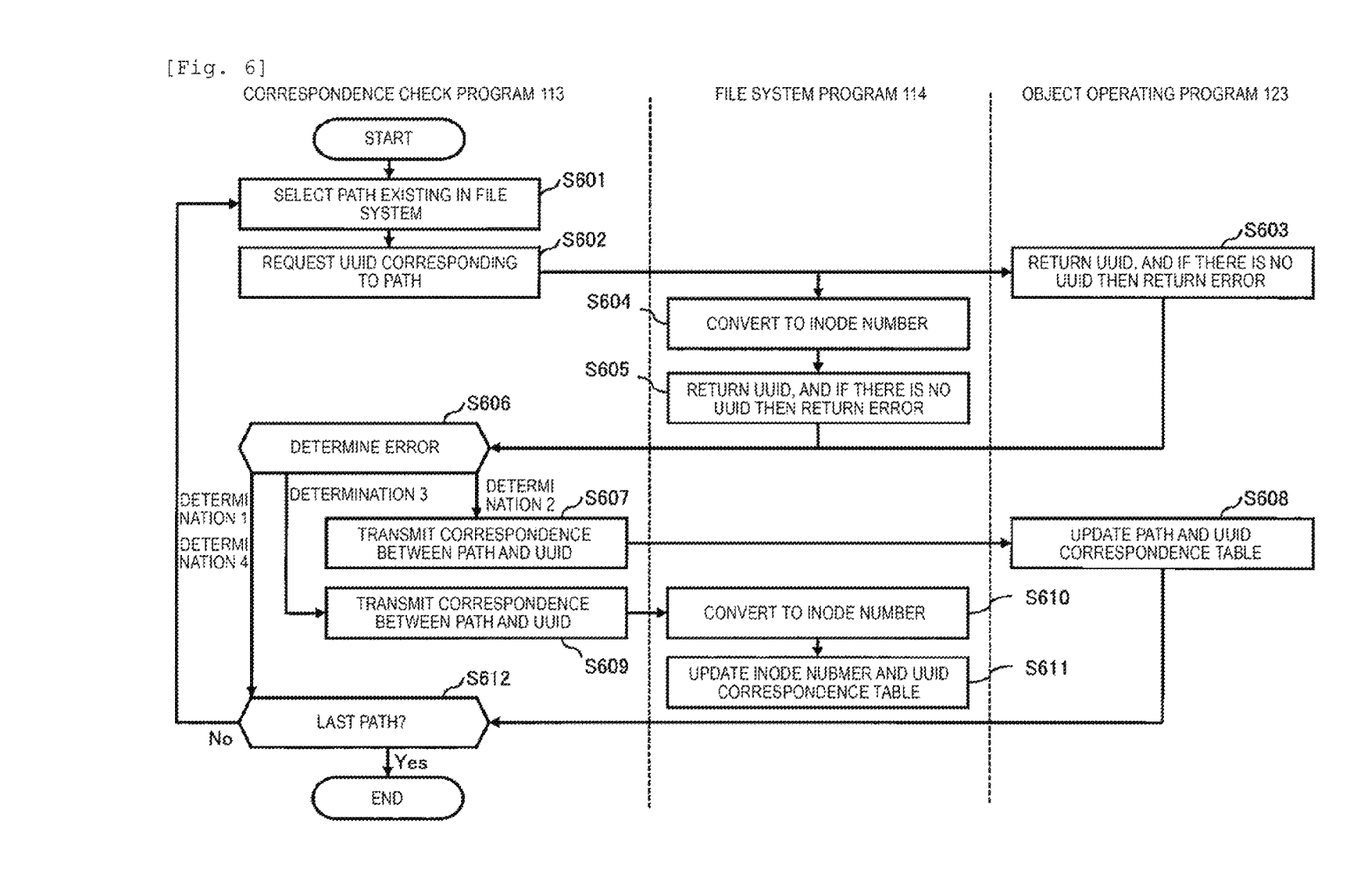
FIG. 6 is a flow chart showing an example of a flow for correspondence check processing according to the invention.

FIG. 6 is a flow chart showing an example of the processing flow in which the correspondence check program 113 checks the correspondence between the inode number and the UUID and the correspondence between the path and the UUID. In this processing, if one of the correspondence between inode number and the UUID and the correspondence between the path and the UUID is lost with respect to any file (or directory) related thereto, the lost correspondence is restored through the other correspondence. The correspondence check of this embodiment is performed at a regular period (asynchronous) such as at a time a day accompanying the archiving process and the like as a trigger. The archive, however, may be performed synchronously with operations for creating, updating, deleting, renaming the file (or directory), or at a random timing based on a client or an administrator. Each step of the processing will be described below.

In step S601: The correspondence check program 113 selects, among the paths which exist in the file system 111, a path which does not yet go through this correspondence checking. The paths which exist in the file system 111 are the paths of the file (or directory) which are managed in the file system 111.

Step S602: The correspondence check program 113 transmits the selected path to the file system program 114 and the object operating program 123 and requests the UUID corresponding to the path.

Step S603: With reference to the path and UUID correspondence table 500, the object operating program 123 retrieves the UUID corresponding to the received path. If the UUID corresponding to the received path is recorded in the path and UUID correspondence table 500, the UUID is returned to the correspondence check program 113. If not recorded, an error is returned to the correspondence check program 113. The process proceeds to step S606.

Step S604: With reference to the path and inode number correspondence table 300, the file system program 114 converts the received path to an inode number.

Step S605: With reference to the inode number and UUID correspondence table 400, the file system program 114 retrieves a UUID corresponding to the converted inode number. If the UUID corresponding to the inode number is recorded in the inode number and UUID correspondence table 400, the UUID is returned to the correspondence check program 113. If not recorded, an error is returned to the correspondence check program 113. The process proceeds to step S606.

Step S606: The correspondence check program 113 determines the return from the file system program 114 and the object operating program 123 as follows.

Determination 1: If both the file system program 114 and the object operating program 123 return the UUID, the process proceeds to step S612.

Determination 2: If the file system program 114 returns the UUID, and the object operating program 123 returns the error, the process proceeds to step S607.

Determination 3: If the file system program 114 returns the error and the object operating program 123 returns the UUID, the process proceeds to step S609.

Determination 4: If both the file system program 114 and the object operating program 123 return the error, the process proceeds to step S612.

If the file system program 114 and the object operating program 123 return different UUIDs, the process may proceed to step S612.

Step S607: If Determination 2 is determined through S606, for example, the operation for renaming the file (or directory) causes the correlation between the selected path and the UUID in the path and UUID correspondence table 500 to be lost. Accordingly, the correspondence check program 113 transmits the correspondence between the selected path and the received UUID from the file system program 114 to the object operating program 123 and instructs the update of the path and UUID correspondence table 500.

Step S608: The object operating program 123 updates the path and UUID correspondence table 500 using the correspondence between the selected path and the received UUID from the file system program 114 to restore the lost correlation. Subsequently, the process proceeds to step S612.

Step S609: If Determination 3 is determined in S606, for example, because of the overwriting which causes the file (or directory) to be deleted, in the inode number and UUID correspondence table 400, the correlation between the inode number corresponding to the selected path and the UUID is lost. Accordingly, the correspondence check program 113 transmits the correspondence between the selected path and the received UUID from the object operating program 123 to the file system program 114.

Step S610: With reference to the path and inode number correspondence table 300, the file system program 114 converts the received path into an inode number.

Step S611: The file system program 114 updates the inode number and UUID correspondence table 400 using the correspondence between the UUID and the inode number which is converted from the received path to restore the lost correlation. Subsequently, the process proceeds to step S612.

Step S612: If this correspondence check is performed with respect to all of the paths which exist in the file system 111, the correspondence check program 113 terminates the processing. If there remains any path which is not subjected to this correspondence check, the process returns to step S601.

The flow of the processing for the correspondence check is as described above. Herein, if this correspondence check is performed accompanying the archive processing as a trigger, the file (or directory) to be archived may be configured to be selected in step S601. Further, if this correspondence check is performed in synchronization with the operations for creating, updating, deleting, and renaming the file (or directory), the file (or directory) which is created, updated, deleted and renamed may be configured to be selected in step S601.

Next, a description will be made for an aspect in which the inode number and UUID correspondence table 400 is updated if Determination 3 is determined in step S606, with reference to FIG. 7 and FIG. 8.

Figure 7:
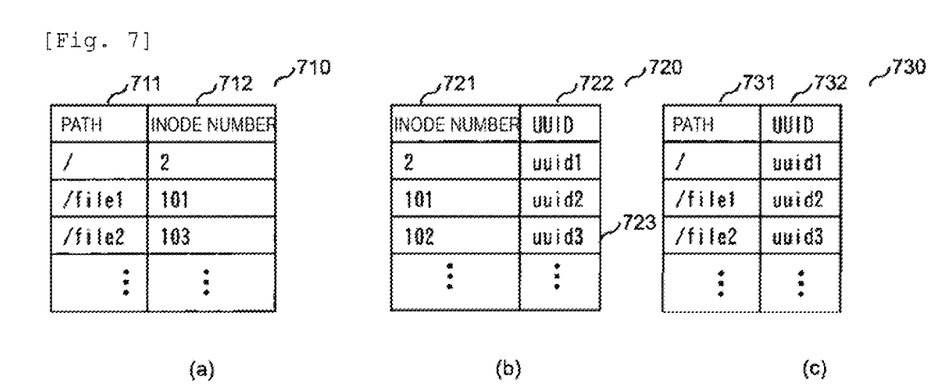
FIG. 7 is a diagram showing an example of each correspondence table at a timing t1 according to the invention.
Figure 8:
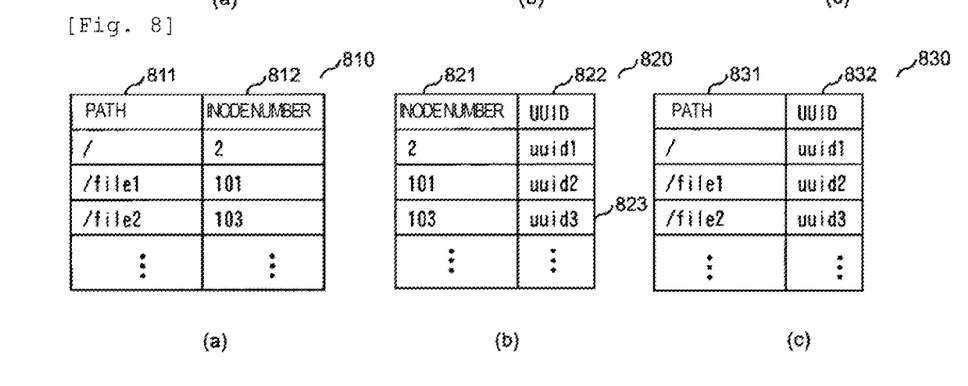
FIG. 8 is a diagram showing an example of each correspondence table at a timing t2 according to the invention.

FIG. 7 shows examples of the path and inode number correspondence table 710 (FIG. 7(*a*)), the inode number and UUID correspondence table 720 (FIG. 7(*b*)), and the path and UUID correspondence table 730 (FIG. 7(*c*)), when Determination 3 is determined in step S606. The time at which the file and directory 112 corresponds to the path, the inode number and the UUID as shown in FIG. 2, FIG. 3 and FIG. 4 is assumed to be a time t0. After t0, if any operations such as overwriting which cause the inode number to be changed are performed for the file existing in the path "/file2" and change the inode number from "102" to "103", the time at which the inode number is changed from "102" to "103" is assumed to be time t1. FIG. 7 shows each correspondence table at the time t1. FIG. 8 shows each correspondence table at the time t2 after the inode number and UUID correspondence table 720 is updated.

It is assumed that in step S601, the correspondence check program 113 selects the path "/file2". In step S605, the file system program 114 returns an error because a row corresponding to the inode number "103" is not recorded in FIG. 7(*b*). On the other hand, the object operating program 123 acquires the UUID "uuid3" corresponding to the path "/file2" from the FIG. 7(*c*) and returns the acquired UUID to the correspondence check program 113. Therefore, in step S606, the correspondence check program 113 determines Determination 3 and the process proceeds to step S609. In step S609, the correspondence check program 113 transmits the selected path "/file2" and the received UUID "uuid3" to the file system program 114. In step S610, the file system program 114 converts the received path "/file2" into the inode number "103". In step S611, the file system program 114 deletes a row 723 corresponding to the received UUID "uuid3" from FIG. 7(*b*), and additionally writes the correspondence 823 between the inode number "103" and the received UUID "uuid3" to the inode number and UUID correspondence table 820.

As noted above, a method of updating the inode number and UUID correspondence table 400 if Determination 3 is determined in step S606 is described. However, the same description may also be applied to a method of updating the path number and UUID correspondence table 500 if Determination 2 is determined in step S606.

Further, if in step S606, Determination 4 is determined, the file (or directory) which is in the selected path is a newly created file (or directory), or a file (or directory) correlation with the archived object of which is lost. If the correspondence check program 113 performs this correspondence check in synchronization with operations such as an operation of overwriting a file (or directory) which causes the inode number to be changed, or in synchronization with an operation of renaming a file (or directory) which causes a path to be changed, both the correspondence between the path and the UUID and the correspondence between the inode number and the UUID are not lost at the same time, and, accordingly, the correlation between the file (or directory) and the object is not lost.

If an operation occurs in which the inode number and the path are all changed at the same time, the correspondence between the inode number and the UUID and the correspondence between the path and the UUID are both lost eventually. In this case, if a difference between a path before change and a path after change is small, the paths are regarded as identical to each other and thus the UUID corresponding to the path before change may be made to correspond to the path after change and the inode number after change. As examples of the small difference, there is a case in which a difference may occur only in a file extension before and after the change of the path and the like.

<Restoring Processing of the Old Version>

It is considered that the specific file or directory is restored to an old version as a use case of this embodiment. The old version referred to herein is a file (or directory) which is archived as an object at the time of a previous-time archive. Hereinafter, an outline of a processing through which the file restoring program 116 restores a specific file (or directory) will be described.

First, the client 103 requests the file restoring program 116 to restore the file (or directory) disposed in a specific path. The file restoring program 116 converts the path to an inode number and acquires a UUID corresponding to the converted inode number. The file restoring program 116 acquires an object which is identified through the acquired UUID from the object operating program 123. The file restoring program 116 stores the acquired object in the path.

As described above, in the first embodiment, when the correspondence between the inode number and the UUID, and the correspondence between the path and the UUID are one to one, the correspondence check program 113 checks the correspondences for all of the files and directories. If any one of the correspondences between the inode number and the UUID and the correspondence between the path and the UUID is lost as a result of the correspondence check, the lost correspondence is restored using the correspondence which is not lost and the correspondence between the path and the inode number. Accordingly, the client is able to access the file which is archived to the object storage 120, and thus is able to meet the client's demand previously described.

When the restoration of the correspondence relationship between the file identifier in the archive destination and the path and the inode is performed in synchronization with operations of creating, updating, deleting, and renaming the file (or directory) or the like, and for example if the path is changed into the new path, the path before change may be directly changed to the new path after change in the path and UUID correspondence table 730. However, if it is considered that the restoration of the correspondence relationship is performed in non-synchronization with operations of creating, updating, deleting, renaming the file (or directory) or the like, for example, the path before change is already replaced with the new path and thus it is difficult to figure out the correspondence between the path before change and the new path after change. For this reason, it is not able to directly change the path and UUID correspondence table 730. Therefore, as described in the correspondence check processing of this embodiment, if any one of the correspondence between the inode number and the UUID and the correspondence between the path and the UUID is lost, the lost correspondence is restored using the correspondence which is not lost and the correspondence between the path and the inode number. Accordingly, without creation of new data such as logging of changing the path or the inode number, it is possible to asynchronously update the correspondence relationship between the file identifier in the archive destination and the path and the inode.

Under the environment of cloud storage, in many cases, the file storage 110 disposed in the site 100 of the client 103 is geographically remote from the object storage 110 disposed in the data center 101. Therefore, if the restoration of the correspondence relationship between the file identifier in the archive destination and the path and the inode is performed in synchronization with operations of creating, updating, deleting, renaming the file (or directory) or the like, it is considered that there are some problems that a delay in responding to the client 103 may occur, and also an error is returned to the client if interference occurs in the object storage 110. The restoration of the correspondence relationship can be asynchronously performed to advantageously resolve those problems.

The advantages described herein are similar to those in the second embodiment to be described below. Further, regardless of whether the correspondence check processing according to the invention is performed in synchronization or non-synchronization with the operations of creating, updating, deleting, renaming the file (or directory) or the like, of course, the invention can also resolve the problems that the invention intends to resolve as described above.

Second Embodiment

Hereinafter, the second embodiment will be described. The following description will mainly provide the different points from those of the first embodiment, and the common points with those of the first embodiment will not repeated or will be briefly explained.

In the first embodiment, the file (or directory) and the object correspond to each other by one to one. Whereas, in the second embodiment, the file (or directory) and the object correspond to each other by one to a plurality.

<System Configuration>

The first embodiment is based on the premise that the object storage 120 identifies the object through the UUID uniquely. On the other hand, there is another object storage 120 that combines the URL with the version to identify the object uniquely. In the object storage 120 of the former, there is no relationship between one object and another object. Whereas in the object storage 120 of the latter, one URL is correlated with a plurality of objects. A plurality of objects which have the same URL correspond to for example those which are created with any file (or directory) archived at different times. The time when the object is archived is managed with a version. The second embodiment is based on the premise of the object storage 120 in which a plurality of identifiers is combined with each other to identify the object uniquely, like combination of the URL with the version.

This embodiment is different from the first embodiment in that the file system 111 manages the inode number and URL correspondence table 900 instead of the inode number and UUID correspondence table 400 and the name space 121 manages a path and URL correspondence table 1000 instead of the path and UUID correspondence table 500.

<Archive Processing>

The object storage 120 combines the URL with the version to identify the object 122. At the first-time archive, the archive program 115 allocates the URL to the file (or directory) to archive the file (or directory) as an object which is identified with the URL and version "1". At the time of archive after this time, the archive program 115 archives the file (or directory) as an object identified with the URL allocated at the first-time archive and a version which is created by adding 1 to a version created at the previous-time archive. A object or a plurality of object, to which the URL is allocated according to the archive processing described above, corresponds to those which are created with any file (or directory) archived at different times. When the object is archived is managed with the version.

Figure 9:
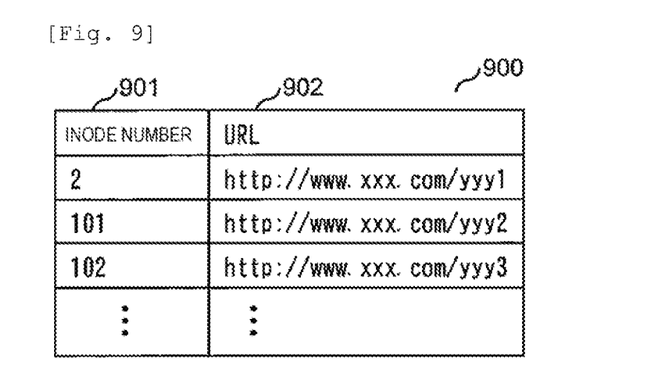
FIG. 9 is a diagram showing an example of an inode number and URL correspondence table according to a second embodiment of the invention.

FIG. 9 is a diagram showing an example of a configuration of the inode number and URL correspondence table 900, and the inode number and URL correspondence table 900 manages a correspondence relationship between the inode number and the URL allocated to the file (or directory). The inode number and URL correspondence table 900 is configured to include an inode number 901 and a URL 902.

Figure 10:
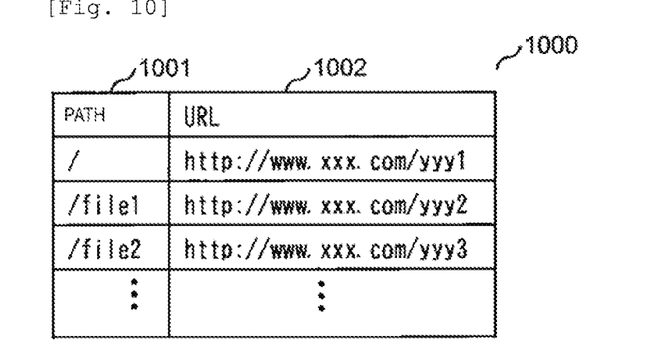
FIG. 10 is a diagram showing an example of a path and URL correspondence table according to the second embodiment of the invention.

FIG. 10 is a diagram showing an example of a configuration of the path and URL correspondence table 1000, and the path and URL correspondence table 1000 manages a correspondence relationship between the path and the URL allocated to the file (or directory). The path and URL correspondence table 1000 is configured to include a path 1001 and a URL 1002.

Figure 11:
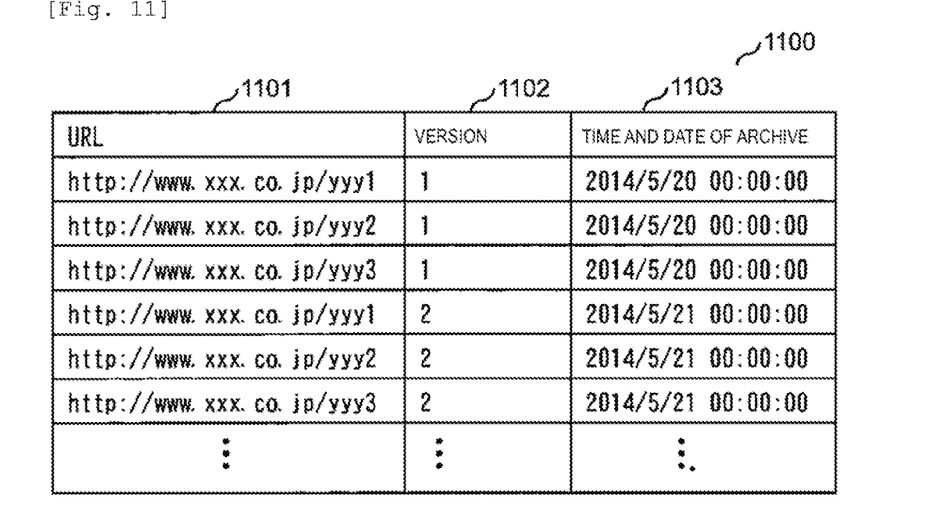
FIG. 11 is a diagram showing an example of a version management table according to the second embodiment of the invention.

FIG. 11 is a diagram showing an example of a configuration of the version managing table 1100. The version managing table 1100 is configured to include a URL 1101, a version 1102, and a day and time of archive 1103.

The examples shown in FIG. 9 to FIG. 11 are based on the premise of the path and inode number correspondence table 300 shown in FIG. 2. For example, an inode number "102" is allocated to the file disposed in the path "/file2". In the examples of FIG. 9 to FIG. 11, in the file, there is a correlation between an object identified with a combination of a URL http://www.xxx.com/yyy3 and a version "1" and an object identified with a combination a URL and version "2". In other words, in the file, there are two old versions which can be identified with combinations of the URL and the version "1" or the version "2", respectively. In this embodiment, the inode number and URL correspondence table 900 is managed with the file storage 110, but may be managed with the file storage 110 and/or the object storage 120. Further, in this embodiment, the path and URL correspondence table 1000 is managed with the object storage 120, but may be managed with the file storage 110 and/or the object storage 120. Furthermore, in this embodiment, the version managing table 1100 is managed with the file storage 110, but may be managed with the file storage 110 and/or the object storage 120.

<Correspondence Check Processing>

In this embodiment, the inode number and the URL, and the path and the URL correspond to each other by one to one, respectively, and the URL corresponds to one version or a plurality of versions such that the file (or directory) is correlated with one object or a plurality of objects. For this reason, similarly to the first embodiment, also in this embodiment, if both of the inode number and the path are changed, the correlation between the file (or directory) and one object or a plurality of objects becomes released. In order to maintain the correlation, when one of the inode number and the path is changed, through the correspondence between the other one that is unchanged and the URL, the correspondence between the changed inode number or path and the URL is updated. The method of the correspondence check and the update is similar to that shown in FIG. 6. In other words, in the description of <Correspondence check processing> in FIG. 6 and the first embodiment, the UUID is replaced with the URL, the inode number and UUID correspondence table 400 is replaced with the inode number and URL correspondence table 900, and the path and UUID correspondence table 500 is replaced with the path and URL correspondence table 1000, which resultantly correspond to the correspondence check processing of the second embodiment.

<Restoring Processing of the Old Version>

Similarly to the first embodiment, it may be considered that specific file (or directory) is restored to an old version as an application example of the second embodiment. In the first embodiment, only one old version can be restored, whereas in the second embodiment, any of a plurality of versions may be selected for restoration.

Figure 12:
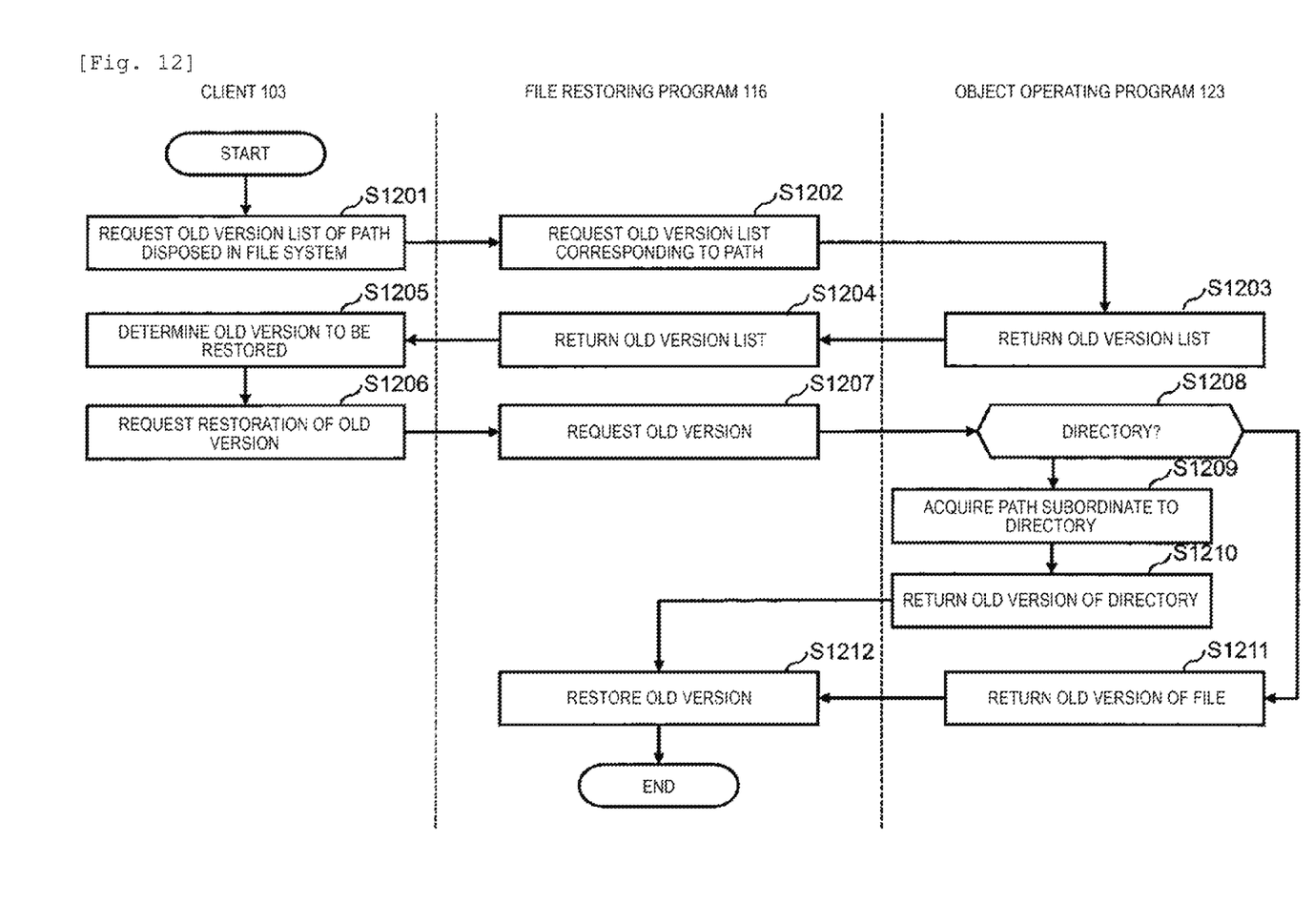
FIG. 12 is a flow chart showing an example of a flow of restoration processing of the old version according to the second embodiment of the invention.

FIG. 12 is a diagram showing an example of a processing flow in which the file restoring program 116 restores the file (or directory) to an old version, according to a request from the client 103.

Step S1201: The client 103 transmits any path to the file restoring program 116 to resultantly request an old version list of the path of the file restoring program 116. The path is referred to as a restoration starting point path.

Step S1202: The file restoring program 116 transmits the restoration starting point path to the object operating program 123.

Step S1203: With reference to the path and URL correspondence table 1000, the object operating program 123 acquires a URL corresponding to the restoration starting point path. Subsequently, with reference to the version managing table 1100, the object operating program 123 acquires all of the rows in which the acquired URL is recorded in the URL 1101. Finally, the object operating program 123 returns all of the acquired rows, that is, an old version list to the file restoring program 116.

Step S1204: The file restoring program 116 returns to the client the old version list received from the object operating program 123.

Step S1205: The client 103 determines a version is to be restored from the received old version list.

Step S1206: The client 103 transmits the URL 1101, the version 1102 and a time and date of archive 1103 in the determined version, and the restoration starting point path to the file restoring program 116 to resultantly request that the file (or directory) of the restoration starting point path is restored to the determined version.

Step S1207: The file restoring program 116 transmits the URL 1101, the version 1102, the time and date of archive 1103 which are received from the client 103, and the restoration starting point path to the object operating program 123.

Step S1208: The object operating program 123 determines whether the restoration starting point path is the file or the directory. If it is the directory, the process proceeds to step S1209, and if it is the file, the process proceeds to step S1211.

Step S1209: With reference to the path and URL correspondence table 1000, the object operating program 123 acquires the path 1001 and the URL 1002 in all of the files (directories) which are subordinate to the restoration starting point path. The acquired one path or plural paths and the restoration starting point path are referred to as "a restoration path".

Step S1210: With reference to the version managing table 1100, the object operating program 123 acquires a version 1102 corresponding to the time and date 1103 of the archive received from the file restoring program 116 with respect to each of the acquired URL 1002. The object operating program 123 returns the object which is identified with the acquired URL 1002 and the version 1102 together with the restoration path corresponding to the object, to the file restoring program 116, and the process proceeds to step S1212.

Step S1211: The object operating program 123 returns not only the object which is identified with the URL 1101 and the version 1102, but also the restoration starting point path received from the file restoring program 116, to the file restoring program 116, and the process proceeds to step S1212.

Step S1212: The file restoring program 116 restores the one object or the plural objects received from the object operating program 123 to the restoration path which is received at the same time. If the file (or directory) is in the restoration path, the file (or directory) is overwritten with the object received from the object operating program 123.

The old version restoration processing is as described above. The description is only an example, the scope of the invention is not limited thereto.

For example, in step S1215, if the file (or directory) is in the restoration path, the file restoring program 116 may do rename the file (or directory) to a separate path, or may confirm the processed contents to the client 103. Further, in step S1215, the file restoring program 116 may delete the file (or directory) existing in the restoration starting point path before restoring the file (or directory).

Further, for example, in step S1202, with reference to the path and inode number correspondence table 200 and the inode number and URL correspondence table 900, the file restoring program 116 converts the restoration starting point path to the URL, and transmits the converted URL to the object operating program 123. In step S1203, with reference to the version managing table 1100, the object operating program 123 may acquire all of the rows in which the URL received from the file restoring program 116 is recorded in the URL 1101.

As described above, in the second embodiment, the object can be identified with a combination of the URL and the version. In order to correlate one object or plural objects with the file (or directory), the inode number and the URL are correlated with each other and the path and the URL are correlated with each other, and the URL is corresponding to one version or plural versions. The correspondence check program 113 checks the correspondence between the inode number and the URL, and the correspondence between the path and the URL, with respect to all of the files and directories.

If any one of the correspondence between the inode number and the URL and the correspondence between the path and the URL is lost as a result of the correspondence check, the lost correspondence is restored using the other correspondence. Accordingly, the client is able to restore the old file archived in the object storage, and thus it is possible to meet the client's demand previously mentioned. Further, in the second embodiment, since the client is able to randomly select any file, which the client wants to restore, from a plurality of old versions of the files which are archived in the object storage, the convenience for a client can be further improved.

Two embodiments of the invention are described as above, which are only examples for explaining the invention. The scope of the invention is not limited to those embodiments. Other various aspects may be implemented according to the invention.

For example, the method of identifying the file and directory in the file storage 110 may use a path or leading cluster number, a path or URL, or a path or UUID instead of the path or inode number. Further, as long as the identifier can identify the file (or directory) uniquely, any type of identifier such as the path, the inode number, the leading cluster number, the URL, the UUID and any identifier other than those identifiers may be used to identify the file and the directory.

Similarly, the method of identifying the object in the object storage 120 may use any other identifiers instead of the combination of the UUID or the URL and the version as long as they can identify the object uniquely. Further, any separate file storage as the archive destination of the file storage 110, instead of the object storage 120 may be provided in the data center 101. In this case, for example, in a state where the correspondence between the path in the archive source file storage 110 and the path in the archive destination file storage, and the correspondence between the inode number in the archive source file storage 110 and the path in the archive destination file storage are created, thereby the archive source file (or directory) and the archive destination file (or directory) may be correlated with each other. Further, in the invention, a file does not need to be distinguished from a directory or an object, but may mean data aggregate which is identified with identifiers.

Further, the invention is not limited to the file storage 110 and the object storage 120, and a system that archives the file (or directory) from an archive source which identifies the file (or directory) with two types of identifiers to an archive destination which identifies the file (or directory) with the identifier which is different from those of the archive source may be also applied to the invention.

Further, the invention is not limited to the archive. For example, through the invention, it is possible to attain the same effect even under a backup environment in which the file (or directory) held by the object storage 120 is constantly maintained in the latest state.

REFERENCE SIGNS LIST

10 . . . Computing machine system
100 . . . Site
101 . . . Data center
102 . . . Network
103 . . . Client
104 . . . Network
110 . . . File storage
111 . . . File system
112 . . . File and directory
113 . . . Correspondence check program
114 . . . File system program
115 . . . Archive program
116 . . . File restoring program
120 . . . Object storage
121 . . . Name space
122 . . . Object
123 . . . Object operating program
300 . . . Path and inode number correspondence table
400 . . . Inode number and UUID correspondence table
500 . . . Path and UUID correspondence table
900 . . . Inode number and URL correspondence table
1000 . . . Path and URL correspondence table
1100 . . . Version managing table

The invention claimed is:

1. A storage system including a first storage apparatus and a second storage apparatus, in which the first storage apparatus is disposed in a client site, and the second storage is disposed in a data center, and in which the storage system archives a file including both of meta data and substantial data from the first storage apparatus to the second storage apparatus through a network, deletes the substantial data from the first storage apparatus, copies the substantial data from the second storage apparatus to the first storage apparatus in case of receiving an I/O for the file, restores the file in the first storage apparatus, and executes the I/O to the restored file, wherein the first storage apparatus identifies the file with a path, and further identifies the file with an inode number,
the second storage apparatus identifies the file with a URL,
the first storage apparatus manages a correspondence relationship between the path and the inode number and a correspondence relationship between the inode number and the URL,
the second storage apparatus manages a correspondence relationship between the path and the URL,
if the path which manages the file is changed, the storage system specifies the URL corresponding to the changed path on the basis of the correspondence relationship between the path and the inode number and the correspondence relationship between the inode number and the URL, and correlates the changed path with the URL which is specified on the basis of the correspondence relationship between the path and the inode number and the correspondence relationship between the inode number and the URL, in the correspondence relationship between the path and the URL to resultantly update the correspondence relationship between the path and the URL, and
if the inode number which manages the file is changed, the storage system specifies the URL corresponding to the changed inode number on the basis of the correspondence relationship between the path and the inode number and the correspondence relationship between the path and the URL, and correlates the changed inode number with the URL which is specified on the basis of the correspondence relationship between the path and the inode number and the correspondence relationship between the path and the URL, in the correspondence relationship between the inode number and the URL to thereby update the correspondence relationship between the inode number and the URL.

2. The storage system according to claim 1, wherein the second storage apparatus further manages a version of the file with a version identifier, and combines the URL with the version identifier to identify one version of the file, the storage system transmits a version list of the file to the client, and restores the version of the file which is selected for the client from the transmitted version list of the file from the second storage apparatus to the first storage apparatus.

3. The storage system according to claim 1, wherein the first storage apparatus transmits the path which manages the file, to the second storage apparatus, and specifies the inode number corresponding to the path on the basis of the correspondence relationship between the path and the inode number, if the URL corresponding to the path which is transmitted from the first storage apparatus corresponds to the path in the correspondence relationship between the path and the URL, the second storage apparatus transmits the URL to the first storage apparatus,
if the specified inode number and the URL correspond to each other in the correspondence relationship between the inode number and the URL, and if the URL is not received from the second storage apparatus, the first storage apparatus transmits the path and the URL to the second storage apparatus,
the second storage apparatus correlates the path and the URL with each other which are transmitted from the second storage apparatus in the correspondence relationship between the path and the URL, and thereby updates the correspondence relationship between the path and the URL, and
if the URL corresponding to the specified inode number does not correspond to the specified inode number in the correspondence relationship between the inode number and the URL, and if the URL is received from the second storage apparatus, the second storage apparatus correlates the specified inode number with the received URL in the correspondence relationship between the inode number and the URL, and thereby updates in the correspondence relationship between the inode number and the URL.

4. The storage system according to claim 1, wherein the storage system performs updating the correspondence relationship between the path and the URL and the correspondence relationship between the inode number and the URL, upon taking an opportunity of executing the archive.

5. A server apparatus that is connected to a first storage apparatus and a second storage apparatus, wherein the first storage apparatus identifies a file with a first identifier, further identifies the file with a second identifier and archives the file in the second storage apparatus, and the second storage apparatus identifies the file with a third identifier, and manages a first correspondence relationship between the first identifier and the third identifier,
the server apparatus manages a third correspondence relationship between the first identifier and the second identifier and a second correspondence relationship between the second identifier and the third identifier,
if the first identifier which manages the file is changed, the server apparatus specifies the third identifier corresponding to the changed first identifier on the basis of the third correspondence relationship and the second correspondence relationship, transmits the specified third identifier and the changed first identifier to the second storage apparatus, and instructs to update the first correspondence relationship, and
if the second identifier which manages the file is changed, the server apparatus correlates the third identifier with the changed second identifier in the second correspondence relationship and thereby updates the second correspondence relationship, the third identifier corresponding to the changed second identifier and being specified on the basis of the third correspondence relationship and the first correspondence relationship,
wherein the first identifier is a path, and the second identifier is an inode number, and the third identifier is UUID or URL.

6. The server apparatus according to claim 5, wherein the server apparatus transmits the first identifier identifying the file to the second storage apparatus, and requests to the second storage apparatus the third identifier corresponding to the first identifier in the first correspondence relationship,
the server apparatus specifies the second identifier on the basis of the third correspondence relationship, the second identifier corresponding to the first identifier which identifies the file,
if the specified second identifier and the third identifier correspond to each other in the second correspondence relationship, and if the third identifier is not responded from the second storage apparatus, the server apparatus transmits the first identifier and the third identifier to the second storage apparatus, and thereby instructs to update the first correspondence relationship, and
if the specified second identifier and the third identifier do not correspond to each other in the second correspondence relationship, and if the third identifier is responded from the second storage apparatus, the server apparatus correlates the specified second identifier with the third identifier responded from the second storage apparatus in the second correspondence relationship and thereby updates the second correspondence relationship.

7. The server apparatus according to claim 5, wherein the server apparatus performs transmitting the first identifier and the third identifier to the second storage apparatus and updating the second correspondence relationship, upon taking an opportunity of executing the archive.

8. The server apparatus according to claim 5, wherein the second storage apparatus further manages a version of the file with a fourth identifier, and combines the third identifier with the fourth identifier to specify one version of the file.

9. A control method of a storage system which includes a first storage apparatus and a second storage apparatus, and archives a file from the first storage apparatus to the second storage apparatus, the method comprising:
by the first storage apparatus, identifying the file with a first identifier, and further identifying the file with a second identifier;
by the second storage apparatus, identifying the file with a third identifier;
managing a first correspondence relationship between the first identifier and the third identifier, a second correspondence relationship between the second identifier and the third identifier, and a third correspondence relationship between the first identifier and the second identifier;
if the first identifier which manages the file is changed, specifying the third identifier corresponding to the changed first identifier on the basis of the third correspondence relationship and the second correspondence relationship, and correlating the changed first identifier with the third identifier which is specified on the basis of the third correspondence relationship and the second correspondence relationship, in the first correspondence relationship, thereby updating the first correspondence relationship; and
if the second identifier which manages the file is changed, specifying the third identifier corresponding to the changed second identifier on the basis of the third correspondence relationship and the first correspondence relationship, and correlating the changed second identifier with the third identifier which is specified on the basis of the third correspondence relationship and the first correspondence relationship, in the second correspondence relationship, thereby updating the second correspondence relationship,
wherein the first identifier is a path, and the second identifier is an inode number, and the third identifier is UUID or URL.

10. The control method of a storage system according to claim 9, wherein the first storage apparatus manages the second correspondence relationship and the third correspondence relationship, and the second storage apparatus manages the first correspondence relationship.

11. The control method of a storage system according to claim 10, further comprising: transmitting the first identifier which manages the file, from the first storage apparatus to the second storage apparatus, and specifying the second identifier corresponding to the first identifier on the basis of the third correspondence relationship;
if the third identifier corresponding to the first identifier which is transmitted from the first storage apparatus corresponds to the first identifier in the first correspondence relationship, transmitting the third identifier from the second storage apparatus to the first storage apparatus;
if the specified second identifier and the third identifier correspond to each other in the second correspondence relationship, and if the first storage apparatus does not receive the third identifier from the second storage apparatus, transmitting the first identifier and the third identifier from the first storage apparatus to the second storage apparatus;

correlating the first identifier and the third identifier with each other which are transmitted from the first storage apparatus in the first correspondence relationship, and thereby updating the first correspondence relationship; and if the third identifier corresponding to the specified second identifier does not correspond to the second identifier in the second correspondence relationship, and if the first storage apparatus receives the third identifier from the second storage apparatus, the second storage apparatus associates the received third identifier with the first identifier in the second correspondence relationship, thereby updating the second correspondence relationship.

12. The control method of a storage system according to claim 9, further comprising updating the first correspondence relationship and the second correspondence relationship, upon taking an opportunity of executing the archive.

13. The control method of a storage system according to claim 9, wherein the second storage apparatus further manages a version of the file with a fourth identifier, and combines the third identifier with the fourth identifier to identify one version of the file.

* * * * *